F. B. MERRILL.
CONTAINER.
APPLICATION FILED JUNE 13, 1918.
1,294,930.
Patented Feb. 18, 1919.
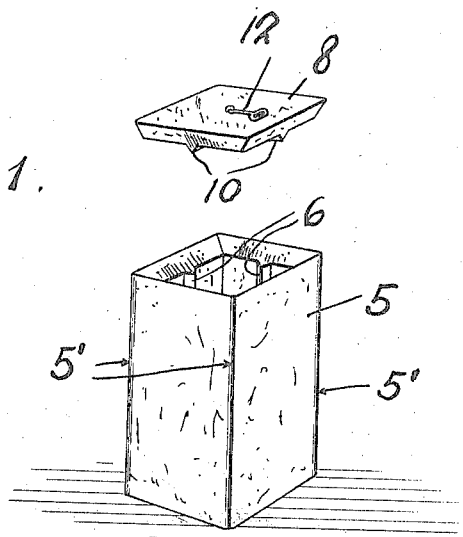
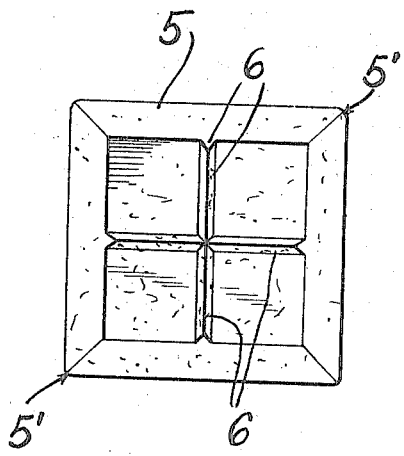
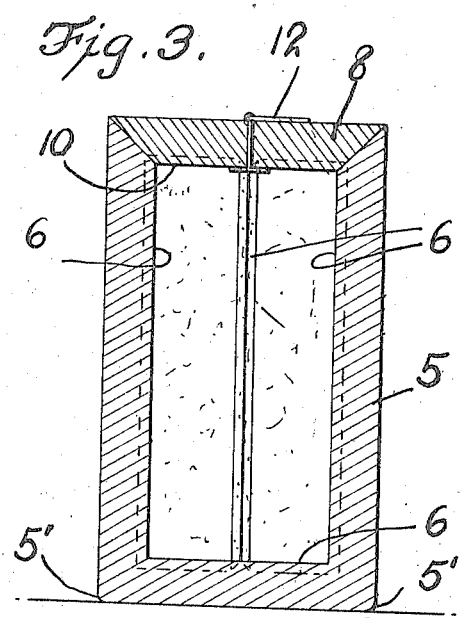
Inventor
Frederick B. Merrill
By A. Milton Buck
Attorney
Witness
L. B. James
M. F. Bergen

UNITED STATES PATENT OFFICE.

FREDERICK B. MERRILL, OF STILLWATER, MINNESOTA.

CONTAINER.

1,294,930.  Specification of Letters Patent.  Patented Feb. 18, 1919.

Application filed June 13, 1918.  Serial No. 239,803.

*To all whom it may concern:*

Be it known that I, FREDERICK B. MERRILL, a citizen of the United States, residing at Stillwater, in the county of Washington and State of Minnesota, have invented certain new and useful Improvements in Containers, of which the following is a specification.

This invention relates to containers, and more particularly to shipping containers.

The primary object of this invention resides in the provision of a container for preserving highly perishable products from deterioration during transportation.

Another object of this invention resides in the provision of a container for preserving perishable products in their proper condition during transportation with the necessity of providing supplemental refrigerating facilities eliminated.

A further object of this invention resides in the provision of a container having means therein for reducing its area of contact with the products contained therein to a minimum.

A still further object of this invention resides in the provision of a container which consists of certain novel features of construction and combination of elements to be more fully set forth in the specification herewith and pointed out in the appended claim.

In the accompanying drawing:—

Figure 1 is a perspective view of the container in open position;

Fig. 2 is a plan view of the container with the cover removed;

Fig. 3 is an enlarged sectional view therethrough.

In the present embodiment of this invention, the numeral 5 designates the container which is preferably made from vegetable fiber, such as wood pulp, and coated inside and outside with any desired impervious material. In order to prevent the disfiguration of the container the corners thereof are rounded as at 5'.

Formed on the interior walls of this container are inwardly directed ribs 6 which are preferably formed from the same product as the container for the purpose of retaining the contents therein in spaced relation to the adjacent walls of the container, thus subjecting the products therein to contact with but a small area of the surface of the container. With the product so disposed in the container a dead air chamber is produced which further insures the insulations of the product from the exterior atmosphere.

Adapted to close the container is a removable cover 8 having inwardly beveled sides which coincide with similarly beveled sides of the container when the same is sealed for transportation. The aforesaid cover has ribs 10 formed on its inner surface for a similar purpose as that of the aforesaid ribs 6.

Securely carried by the cover is a handle or knob 12 which is adapted to be used in removing the cover from the container.

With this invention fully set forth it is manifest that a container for perishable products has been produced which is cheap of manufacture, readily adapted to perform the functions of its adoption and convenient in transporting, the same being made to eliminate any objections to shipping it by parcel post delivery as it completely insulates its contents from the exterior climatic variations and retains a uniform temperature therein.

Having thus set forth the advantages of this invention, what I claim is:—

The combination with a container having inwardly directed beveled edges at its open end, V-shaped ribs formed on the inner walls of the container and having their outer terminals beveled in alinement with the beveled edges of the container, a cover beveled to fit the open end of the container and V-shaped ribs formed on said cover, and having their outer terminals beveled to bear on the ribs of the container.

In testimony whereof I affix my signature.

FREDERICK B. MERRILL.

In presence of—
DONOLDA CARROLL,
ANNIE CONNORS.

Copies of this patent may be obtained for five cents each, by addressing the "Commissioner of Patents, Washington, D. C."